Oct. 12, 1948.  R. D. DOWNING  2,450,943
BRAKE PEDAL LOCK

Filed Oct. 25, 1946  2 Sheets-Sheet 1

Inventor:
Rexford D. Downing
By Paul O. Pippel
Atty.

Oct. 12, 1948.                    R. D. DOWNING                    2,450,943
                                 BRAKE PEDAL LOCK
Filed Oct. 25, 1946                                              2 Sheets-Sheet 2

Inventor.
Rexford D. Downing
By Paul O. Pippel
Atty

Patented Oct. 12, 1948

2,450,943

UNITED STATES PATENT OFFICE 2,450,943

BRAKE PEDAL LOCK

Rexford D. Downing, Rock Island, Ill., assignor to International Harvester Company, a corporation of New Jersey Application October 25, 1946, Serial No. 705,514

8 Claims. (Cl. 74—534)

1

This invention relates to a new and improved brake pedal lock and has for one of its principal objects the provision of means for releasably holding a brake pedal at any point of its depressed position.

An important object of this invention is to provide a single locking means for adjacent brake pedals on a vehicle of the type having a brake pedal for each side thereof.

Another object of this invention is the provision of a means for individually locking adjacent brake pedals in any desired depressed position, and in spite of the fact that a single means is employed to effect locking of the brake pedals, the pedals may be locked at different levels of depression.

A further object of this invention is to provide a braking means particularly for use with harvester threshers of the self-propelled type and having means for separately braking and locking the brake pedal for both sides of the machine.

A still further object is the provision of a means capable of optionally locking vehicle brake pedals in depressed position or permitting the brake pedals to be lowered and raised without interference.

Other and further important objects of this invention will become apparent from the disclosures in the following specification and accompanying drawings, wherein.

As shown in the drawings.

Figure 1:
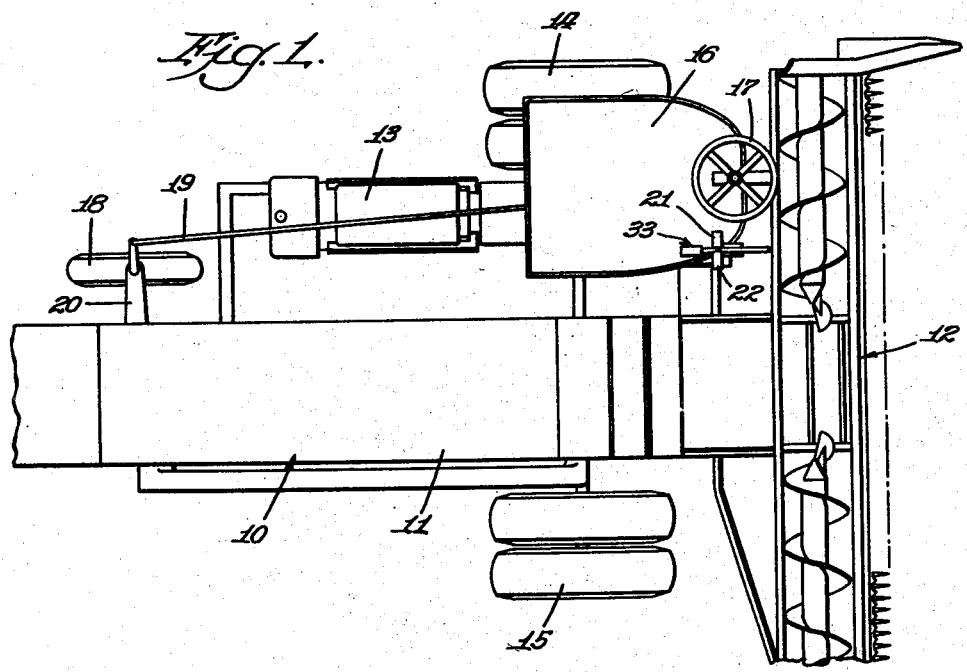
Figure 1 is a top plan view of a self-propelled harvester thresher incorporating the novel brake pedal locking device of this invention.
Figure 2:
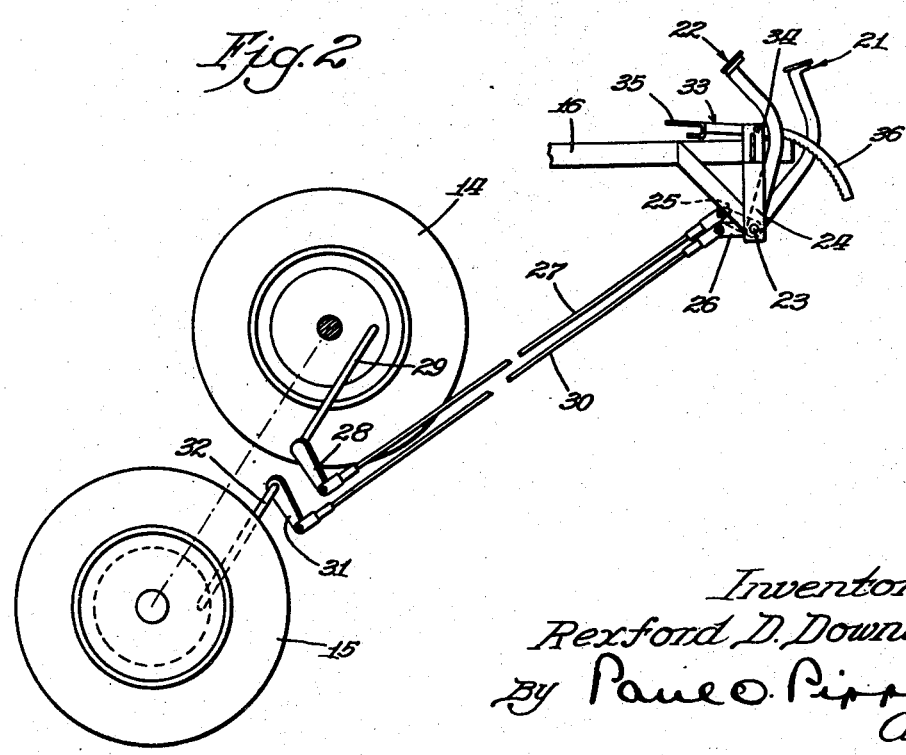
Figure 2 is a side view of the brake pedals employed in the device of Figure 1 and showing their connection to the wheels of the vehicle.

The reference numeral 10 indicates generally a self-propelled combine or the like having a longitudinally extending thresher body 11 and a relatively wide harvesting device or platform 12 mounted across the front end thereof. An engine power unit 13 is adapted to propel the combine 10 by imparting drive to the relatively large widely spaced traction wheels 14 and 15. An operator's

2 station or platform 16 is equipped with a steering wheel 17 adapted to cause a turning of a dirigible wheel 18 through the medium of a connecting link 19. The dirigible wheel 18 is carried on a support 20 positioned substantially at the rear of the combine. Also positioned on the operator's platform 16 are brake pedals 21 and 22 adapted to effect braking of the wheels 14 and 15 respectively.

These brake pedals 21 and 22 are hinged for limited swinging movement at 23 on a bracket 24 depending from the operator's platform 16. Each of the pedals comprises substantially bell-crank levers having portions 25 and 26 extending rearwardly beyond the hinging attachment at 23. A connecting link 27 extends downwardly and rearwardly from its attachment to the portion 25 of the bell-crank pedal 21. The rear end of the connecting link 27 joins a lever arm 28 which is attached to a brake operating shaft 29. This shaft 29 projects into and operates the brake drums on the wheels 14. A second connecting link 30 is attached to the portion 26 of the bell-crank pedal 22 and joins a lever arm 31 which in turn is attached to a brake-operating shaft 32. Upon forward movement or depression of the pedal 21 about the hinge 23 the rearward extension 25 causes the connecting link 27 to be pulled upwardly and forwardly thereby transmitting rotation to the brake operating shaft 29 to effect a braking of the wheel 14. Similarly, when the brake pedal 22 is depressed the connecting link 30 is moved upwardly and forwardly causing rotation of the brake operating shaft 32 and effecting a brake of the wheel 15. It will be apparent therefore that each of the wheels 14 and 15 may be braked separately.

In self-propelled combines of this type it is desirable and quite often necessary to be able to brake the spaced traction wheels separately and/or together, and still further it is often desirable to lock the brakes in braking position. Mechanical brakes for individual wheels frequently require various amounts of pedal depression to effect a braking of the wheels. This is due to differences in mechanical elements employed such as springs and also to the different degrees to which the brake band is worn. It should be obvious therefore that in order to effect a separate braking of each of the wheels 14 and 15 the pedals 21 and 22 may and probably will have to be depressed to different levels. As stated above, it is an important object of this invention to provide a single locking means for the brake pedals which will permit depression of the individual brake pedals to different levels and still maintain a locking engagement with both pedals.

Figure 3:
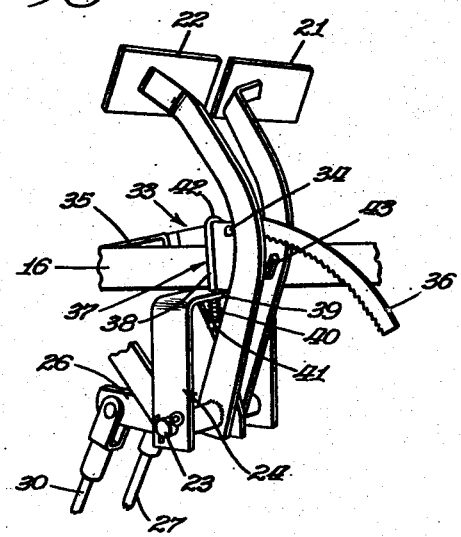
Figure 3 is a perspective view detail of the brake pedals and associated locking means of this invention.

A locking member 33 is pivoted at 34 on an upward extension of the bracket 24 and includes a foot-engaging portion 35 and a rearwardly and downwardly curved ratchet rack 36 positioned between the adjacent brake pedals 21 and 22. As best shown in Figure 3, the lock member 33 may be optionally held in the position shown, that is, with the foot-engaging portion 35 pressed downwardly against the surface of the operator's platform 16, so that the rearwardly extending rack portion 36 is raised. This is accomplished by means of a C-shaped spring-retained latch member 37. The lower portion of this latch 37 comprises a straight shank 38 which passes through an opening in a horizontal surface 39 of the bracket 24. The straight shank 38 is surrounded by a coil spring 40 beneath the horizontal portion 39 of the bracket 24 and has a nut 41 engaged to the lower end thereof thereby holding the spring 40 between the nut 41 and bracket portion 39. The coil spring 40 is of the extension type, thus exerting a downward pull on the shank 38. The upper or C-shaped portion 42 is adapted to be pulled upwardly against the action of the spring and hooked over the locking member 33. This position is shown in Figure 3. The spring 40 then exerts a downward pull on the foot lever portion of the lock member 33 and is swung about its hinge 34 so that the rearwardly extending ratchet rack rises out of contact with inwardly extending pawls or latch members 43 and 44.

Figure 4:
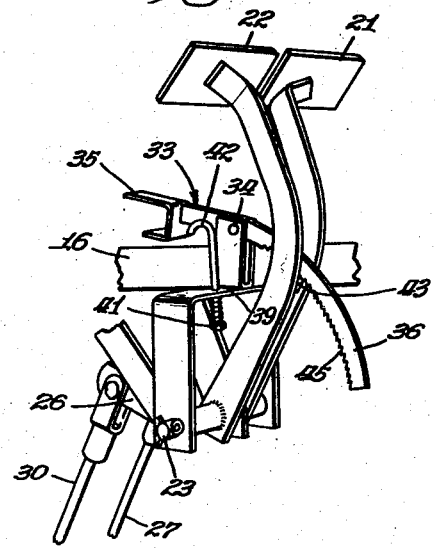
Figure 4 is a view similar to Figure 3 showing the two pedals locked in partially depressed position.
Figure 6:
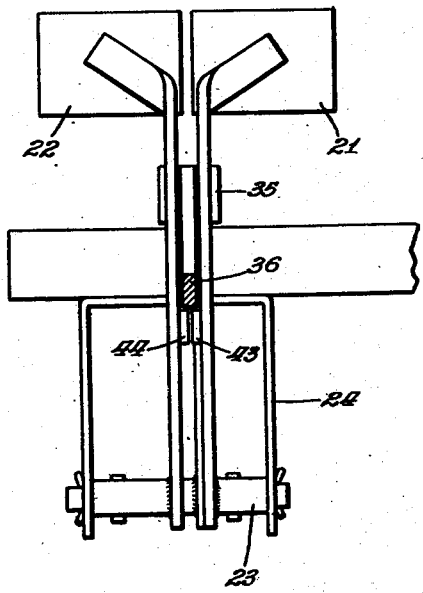
Figure 6 is a rear elevational view of the brake pedal and locking structure.
Figure 5:
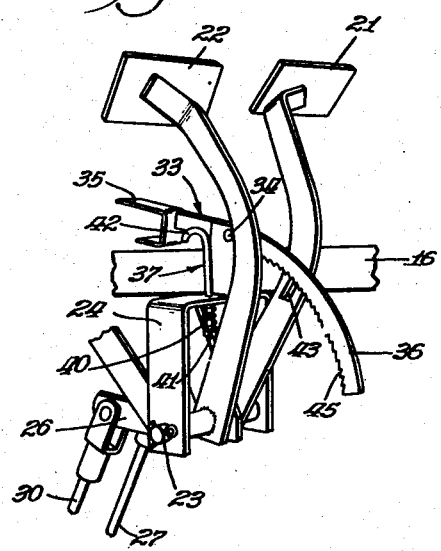
Figure 5 is another view similar to Figures 3 and 4 showing just one of the pedals locked in depressed position.

As shown in Figure 4, the C-shaped latch member 37 has been removed from engagement with the lock member 33, thus leaving a space between the platform 16 and the foot-operating pedal 35 of the lock member 33. The curved rack has been permitted to drop into engagement with the pawls 43 and 44. The weight of the arcuate rack 36 is such that it overbalances the foot-engaging portion 35 of the lock member 33 and thus will remain in pawl-engaging position until such time as additional pressure is exerted on the foot portion 35. The ratchet rack 36 forms a regular portion of a circle about the hinge 23 as a center and is concentric with the path of travel of any fixed part on the hingedly swinging brake pedal arms when the rack is in locking position as shown in Figure 4. Thus as the pedals 21 and 22 are depressed downwardly and forwardly about the hinge 23, the spacing of the rack 36 remains constant with respect to the pawls 43 and 44. As best shown in Figure 6, the rack 36 is sufficiently wide to accommodate both of the pawls 43 and 44. Each of these pawls projects inwardly and rides on just a portion of the ratchet rack 36 rather than extending entirely across the rack. It will be understood that when either of the pedals 21 or 22 is depressed the respective pawls 43 and 44 will lock themselves in ratchet teeth 45 on the under side of the rack 36, and it will be impossible to retract or cause the pedal to move upwardly to its original position without first depressing the foot-engaging portion 35 of the lock member 33. The pedals 21 and 22 operate independently of each other and both may be locked at the same point of depression, as shown in Figure 4, or one may be locked in one depressed position and the other in a different depressed position or up in non-depressed position, such as shown in Figure 5, wherein the pedal 21 and its pawl 43 engage the teeth 45 of the ratchet rack 36. In view of these operating capabilities of the brake lock, the combine or other vehicle on which these brakes are mounted may be braked on a hillside with either one or both brakes in effective locking position, the mechanical differences in the two brakes being ineffective to destroy the single locking means, for the reason that the pedals may be depressed to different positions and both be simultaneously locked. The brake pedals will remain in their depressed positions until such time as the operator desires to release them by causing the ratchet rack to swing upwardly out of engagement with the pawls 43 and 44.

In certain instances it is desirable to be able to release one brake without releasing both brakes. In order to accomplish this most necessary function, the brake pedal operating the brake to be retained is manually held down by one foot of the operator while the other foot releases the locking mechanism so that the arcuate ratchet raises and permits the other brake pedal to return to its upper non-braking position. The arcuate ratchet is then permitted to drop down into reengagement with the pawl of the depressed pedal thereby again locking it in depressed braking position.

Numerous details of construction may be varied throughout a wide range without departing from the principles disclosed herein, and I therefore do not propose limiting the patent granted hereon otherwise than as necessitated by the appended claims.

What is claimed is:

1. In a vehicle having separate mechanical brakes for wheels on each side thereof, separate arcuately depressible brake pedals connected respectively to said separate brakes, said brake pedals swingable about a common axis, an arcuate ratchet rack pivoted to the vehicle spaced from said common brake pedal axis and projecting between the adjacent brake pedals, pawl means on each of said brake pedals, said arcuate ratchet rack normally engageable by both of said pawls, said pawls arranged and constructed to permit depressing of each of said brake pedals independently of the other and to automatically prevent return movement of said brake pedals, and means for releasing said brake pedals.

2. In a vehicle having separate brakes for wheels on each side thereof, separate arcuately depressible brake pedals connected respectively to said separate brakes, said brake pedals swingable about a common axis, an arcuate ratchet rack pivoted to the vehicle and projecting between the adjacent brake pedals, pawl means on each of said brake pedals, said arcuate ratchet rack normally engageable by both of said pawls, said pawls arranged and constructed to permit depressing of each of said brake pedals independently of the other and to automatically prevent return movement of said brake pedals, and means for releasing said brake pedals.

3. In a vehicle having separate mechanical brakes for wheels on each side thereof, separate arcuately depressible brake pedals connected respectively to said separate brakes, said brake pedals swingable about a common axis, an arcuate ratchet rack pivoted to the vehicle spaced from said common brake pedal axis and projecting between the adjacent brake pedals, pawl means on each of said brake pedals, said arcuate ratchet rack normally engageble by both of said pawls, said pawls arranged and constructed to permit depressing of each of said brake pedals independently of the other and to automatically prevent return movement of said brake pedals, and means for releasing said brake pedals, said means including an extension of the ratchet rack beyond its pivotal attachment, whereby depressing of said extension causes a raising of the arcuate portion and a disengagement of the pawls thus leaving the pedals free to return to non-braking position.

4. In a vehicle having separate brakes for wheels on each side thereof, separate arcuately depressible brake pedals connected respectively to said separate brakes, said brake pedals swingable about a common axis, an arcuate ratchet rack pivoted to the vehicle and projecting between the adjacent brake pedals, pawl means on each of said brake pedals, said arcuate ratchet rack being sufficiently wide to be normally engageable by both of said pawls in a side-by-side relationship, said pawls arranged and constructed to permit depressing of each of said brake pedals independently of the other and to automatically prevent return movement of said brake pedals, and means for releasing said brake pedals.

5. In a vehicle having separate mechanical brakes for wheels on each side thereof, separate arcuately depressible brake pedals connected respectively to said separate brakes, said brake pedals swingable about a common axis, an arcuate ratchet rack pivoted to the vehicle spaced from said common brake pedal axis and projecting between the adjacent brake pedals, pawl means on each of said brake pedals, said arcuate ratchet rack normally engageable by both of said pawls, said pawls arranged and constructed to permit depressing of each of said brake pedals independently of the other and to automatically prevent return movement of said brake pedals, means for releasing said brake pedals, and spring-held latching means associated with said vehicle and adapted to be hooked over said ratchet rack for optionally maintaining said rack in an out of pawl-engaging position.

6. An agricultural implement having a frame, brakes associated with wheels on each side of the implement, brakes pedals pivotally mounted on a common axis on said frame and adapted to separately operate the brakes on each side of the implement, a ratchet rack pivotally mounted on said frame and having a portion thereof arcuately shaped to be concentric with arcs formed by depression of the brake pedals when the ratchet rack is in one position, and pawls fixed to each of said brake pedals on the inside thereof, said pawls adapted to engage the entire arcuate portion of said ratchet rack when the rack is in the one position and permit only forward or depressing movement of each of said brake pedals, whereby the brake pedals may be depressed singly or together and stopped at the same or different degrees of depression with the pawls locking each pedal independently of the other.

7. An agricultural implement having a frame, brakes associated with wheels on each side of the implement, brake pedals pivotally mounted on a common axis of said frame and adapted to separately operate the brakes on each side of the implement, a ratchet rack pivotally mounted on said frame and having a portion thereof arcuately shaped to be concentric with arcs formed by depression of the brake pedals when the ratchet rack is in one position, pawls fixed to each of said brake pedals on the inside thereof, said pawls adapted to engage the entire arcuate portion of said ratchet rack when the rack is in the one position and permit only forward or depressing movement of each of said brake pedals, whereby the brake pedals may be depressed singly or together and stopped at the same or different degrees of depression with the pawls locking each pedal independently of the other, and means for swinging said ratchet rack so the arcuate portion is entirely out of contact with the pawls on the brake pedals, whereby the brake pedals may be raised or lowered independently of the ratchet rack.

8. An agricultural implement having a frame, brakes associated with wheels on each side of the implement, brake pedals pivotally mounted on a common axis on said frame and adapted to separately operate the brakes on each side of the implement, a ratchet rack pivotally mounted on said frame and having a portion thereof arcuately shaped to be concentric with arcs formed by depression of the brake pedals when the ratchet rack is in one position, pawls fixed to each of said brake pedals on the inside thereof, said pawls adapted to engage the entire arcuate portion of said ratchet rack when the rack is in the one position and permit only forward or depressing movement of each of said brake pedals, whereby the brake pedals may be depressed singly or together and stopped at the same or different degrees of depression with the pawls locking each pedal independently of the other, and means for swinging said ratchet rack so the arcuate portion is entirely out of contact with the pawls on the brake pedals, whereby the brake pedals may be raised or lowered independently of the ratchet rack, said means including a rearward extension of said rack beyond said pivotal attachment to the frame and hook means on said frame adapted to be put over said extension to hold it down and the arcuate portion up.

REXFORD D. DOWNING.

REFERENCES CITED

The following references are of record in the file of this patent:

UNITED STATES PATENTS

| Number | Name | Date |
|---|---|---|
| 836,640 | Dunn et al. | Nov. 20, 1906 |
| 1,011,905 | Baum | Dec. 19, 1911 |
| 2,383,690 | Sklovsky | Aug. 28, 1945 |

FOREIGN PATENTS

| Number | Country | Date |
|---|---|---|
| 148,940 | Switzerland | Aug. 15, 1931 |